(12) United States Patent  (10) Patent No.: US 6,308,984 B1
Fischer                    (45) Date of Patent:    Oct. 30, 2001

(54) GAS GENERATOR AND DEVICE FOR INFLATING A VEHICLE OCCUPANT RESTRAINT SYSTEM

(75) Inventor: Anton Fischer, Leinweiler (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/560,116

(22) Filed: Apr. 28, 2000

(30) Foreign Application Priority Data

Apr. 29, 1999 (DE) ............................................... 299 07 617

(51) Int. Cl.$^7$ .................................................. B60R 21/26
(52) U.S. Cl. ............................................ 280/741; 280/736
(58) Field of Search ................................... 280/741, 736, 280/740, 742, 737; 222/3

(56) References Cited

U.S. PATENT DOCUMENTS 4,114,924 * 9/1978 Kasagi et al. ...................... 280/740
5,671,945 * 9/1997 Rhule et al. ....................... 280/740
6,213,501 * 4/2001 Hock ................................. 280/736

* cited by examiner

Primary Examiner—Peter C. English
Assistant Examiner—Ruth Ilan
(74) Attorney, Agent, or Firm—Tarolli, Sundheim, Covell, Tummino & Szabo L.L.P.

(57) ABSTRACT

The invention relates to a gas generator, in particular for a vehicle occupant restraint system. The gas generator comprises an outer housing which has a fastening section, and outflow openings in the outer housing. The outflow openings are distributed on the periphery of the outer housing in a region of the fastening section such that thrust neutrality occurs during an outflow of a gas generated by the gas generator. The gas generator further comprises a gas directing part, the fastening section being constructed for arresting the gas-directing part to the outer housing. The outer housing has indentations in the fastening section, and the outflow openings are provided in the indentations. Further, the invention relates to a device for inflating a vehicle occupant restraint system.

10 Claims, 1 Drawing Sheet

GAS GENERATOR AND DEVICE FOR INFLATING A VEHICLE OCCUPANT RESTRAINT SYSTEM

TECHNICAL FIELD

The invention relates to a gas generator, in particular for a vehicle occupant restraint system, and to a device for inflating a vehicle occupant restraint system.

BACKGROUND OF THE INVENTION

Gas generators have to be small in size and must open up the possibility of fastening the gas-directing part, adjoining them in the direction of flow, in a simple and gas-tight manner to the gas generators. In the region of the fastening section the gas generator with the connected gas-directing part is likewise to be small in size, which, however, is not always possible, because in this region also gas-directing channels with a certain minimum cross-section must be present, so that the gas also arrives quickly to the vehicle occupant restraint system (preferably gas bag or belt tensioner). The gas-directing part can preferably be a gas-directing pipe or gas lance leading to a vehicle occupant restraint system. However, the vehicle occupant restraint system can also be fastened directly to the gas generator, e.g. the gas bag can be clamped to the gas generator in the region of its inflation orifice.

BRIEF SUMMARY OF THE INVENTION

The invention provides a gas generator and a device for inflating a vehicle occupant restraint system which is distinguished by a simple, space-saving construction. This is achieved in a gas generator which comprises an outer housing which has a fastening section, and outflow openings in the outer housing. The outflow openings are distributed on the periphery of the outer housing in a region of the fastening section such that thrust neutrality occurs during an outflow of a gas generated by the gas generator. The gas generator further comprises a gas directing part, the fastening section being constructed for arresting the gas-directing part to the outer housing. The outer housing has indentations in the fastening section, and the outflow openings are provided in the indentations. The indentations form flow channels for the generated gas which can arrive from there into the gas-directing part. Whereas hitherto the gas-directing channels always lay entirely outside the usually cylindrical housing, through the indentations the gas-directing channels are moved as it were inwards into the outer housing, whereby space can be saved. The indentations in addition do not require any separate parts delimiting gas flow channels.

Preferably the indentations are constructed in a trough shape so that they are formed in a manner favorable to the flow.

In the preferred embodiment, the outflow openings extend radially outwards and are provided at the deepest point of each indentation. The indentations themselves alternate with protrusions which form fastening surfaces. The gas-directing part can be fastened directly to the fastening surfaces, so that the flow channels are delimited radially on the inner face by the indentations and on the outer face by the gas-directing part, without additional parts being required for this.

Advantageously, the fastening section is an axial end of a cylindrical elongated outer housing and the indentations penetrate the end face of this axial end. The flow channels which are formed by the indentations and the gas-directing part continue in axial direction thereby into the gas-directing part which forms a common large flow channel.

When the fastening section begins with a shoulder in the outer housing, a gas-tight seal can be achieved via this shoulder between the gas generator and the gas-directing part which is fastened thereto.

The invention provides, furthermore, a device for inflating a vehicle occupant restraint system, preferably a side gas bag restraint system having a large area, in which the gas-directing part is fixed directly to the fastening section of the gas generator according to the invention. The indentations, as stated, permit a space-saving construction of the device in the region of the transition between the gas generator and the gas-directing part. This is achieved by the indentations which form flow channels.

Preferably, the gas-directing part is a gas-directing pipe which is slipped onto an axial end of the cylindrical outer housing and is pressed on in a gas-tight manner.

According to the preferred embodiment, the gas-directing part is an elongated gas lance which projects into the interior of a side gas bag having a large area.

DETAILED DESCRIPTION OF THE PREFERRED EMBODIMENT

Figure 1:
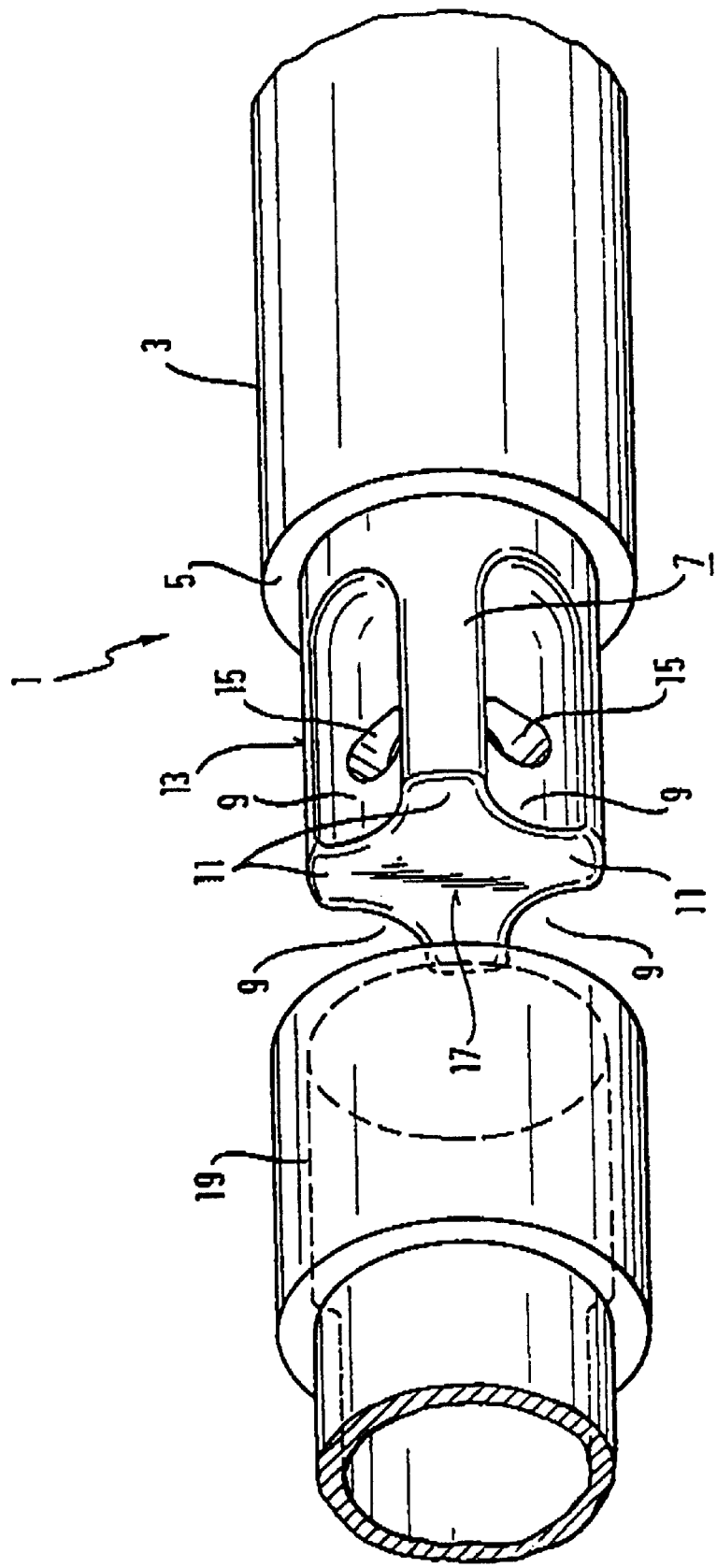
FIG. 1 shows a perspective view of the device according to the invention comprising the gas generator according to the invention.

The device illustrated in FIG. 1 is for inflating a vehicle occupant restraint system in the form of a side gas bag having a large area and covering the side windows of a vehicle in the case of restraint.

In FIG. 1 a gas generator 1 is illustrated. The gas generator 1 has an elongated cylindrical outer housing 3 with an axial end and a fastening section 7 beginning with a shoulder 5. The fastening section 7 has a maximum diameter which is smaller than that of the remaining outer housing 3.

In the region of the fastening section 7, the outer housing 3 has trough-shaped indentations 9 running axially, which alternate with protrusions 11 on the periphery of the housing. The protrusions 11 have fastening surfaces 13 radially on the exterior.

At the deepest point of each indentation 9, the outer housing 3 has at least one outflow opening 15 extending radially outwards. The indentations which run out continuously towards the shoulder 5 penetrate at their other axial end the end face 17 of the axial end of the outer housing 3.

An elongated gas-directing part 19 in the form of a tubular gas lance is slipped axially onto the fastening section 7, until it lies against the shoulder 5. Between the gas-directing part 19 and the fastening faces 13, a press fit is provided. The gas-directing part 19 and the gas generator 1 form a device for inflating a side gas bag having a large area, which is not shown, into which the gas-directing part 19 projects.

Between the outer housing 3, more precisely the indentations 9 and the inner face of the gas-directing part 19, four flow channels are defined, which on the end face 17 continue into a common flow channel which is only formed by the inner face of the gas-directing part 19.

On activation of the gas generator 1, gas is generated which arrives via the outflow openings 15 outwards into the flow channels and further into the gas-directing part 19. Through the gas-directing part 19 the gas is directed into the gas bag.

As FIG. 1 shows, the device is constructed having a very small size radially in the region of the fastening section 7. It is possible through this construction of the gas generator that the outer housing 3 in the region of its greatest diameter has the same radial extension as the gas-directing part 19.

The indentations 9 can be formed by shaping the outer housing 3, so that the outer housing 3 has a covering surface in one piece.

Although the protrusions 13, like the indentations 9, are shown running in axial direction, so that the pushing-on of the gas-directing part 19 is facilitated, they can also run obliquely. The fastening surfaces 13 can have a sawtooth-like structure so that a withdrawal of the gas-directing part 19, which is usually of plastic, is made difficult.

The outflow openings 15 are distributed on the peripheral section of the outer housing 3 and aligned such that the gas generator is neutral with respect to thrust.

What is claimed is:

1. A gas generator, for a vehicle occupant restraint system, said gas generator comprising an outer housing which has a fastening section, outflow openings in said outer housing which are distributed on the periphery of said outer housing in a region of said fastening section such that thrust neutrality occurs during an outflow of a gas generated by said gas generator, and a gas directing part, said fastening section being constructed for fixing said gas-directing part to said outer housing, said outer housing having indentations in said fastening section, and said outflow openings being provided in said indentations.

2. The gas generator according to claim 1, wherein said indentations are constructed in a trough shape.

3. The gas generator according to claim 1, wherein said outflow openings extend radially outwards and are provided at a deepest point of said indentations.

4. The gas generator according to claim 1, wherein protrusions having fastening surfaces on an outer face are provided, said indentations alternating with said protrusions.

5. The gas generator according to claim 1, wherein said outer housing is cylindrical in shape and said fastening section is an axial end of said cylindrical outer housing, and wherein said indentations extend in an axial direction and penetrate an end face of said axial end.

6. The gas generator according to claim 5, wherein a shoulder is provided between said fastening section and said outer housing.

7. A device for inflating a vehicle occupant restraint system, said device comprising a gas generator, said gas generator comprising an outer housing which has a fastening section, outflow openings in said outer housing which are distributed on the periphery of said outer housing in a region of said fastening section such that thrust neutrality occurs during an outflow of a gas generated by said gas generator, and a gas directing part, said fastening section being constructed for fixing said gas-directing part to said outer housing, said outer housing having indentations in said fastening section, and said outflow openings being provided in said indentations, wherein said gas-directing part is fixed to said fastening section of said gas generator.

8. The device according to claim 7, wherein said fastening section is an axial end of said outer housing of said gas generator and wherein said gas-directing part is slipped onto said axial end.

9. The device according to claim 8, wherein said gas-directing part is pressed in a gas-tight manner onto said axial end of said outer housing.

10. The device according to claim 7, wherein said gas-directing part is an elongated gas lance.

* * * * *